US006667738B2

(12) United States Patent  
Murphy

(10) Patent No.: US 6,667,738 B2
(45) Date of Patent: Dec. 23, 2003

(54) TOUCH SCREEN OVERLAY APPARATUS

(75) Inventor: Paul Anthony Murphy, Tai Po (HK)

(73) Assignee: Vtech Communications, Ltd., Tai Po (HK)

(*) Notice: Subject to any disclaimer, the term of this patent is extended or adjusted under 35 U.S.C. 154(b) by 255 days.

(21) Appl. No.: 10/036,900

(22) Filed: Dec. 21, 2001

(65) Prior Publication Data

US 2002/0054030 A1 May 9, 2002

Related U.S. Application Data

(63) Continuation of application No. 09/226,344, filed on Jan. 6, 1999, now abandoned.
(60) Provisional application No. 60/070,652, filed on Jan. 7, 1998.

(51) Int. Cl.[7] .................................. G09G 5/00
(52) U.S. Cl. ........................ 345/173; 345/156
(58) Field of Search ................ 345/156, 173; 178/18.01–18.06

(56) References Cited

U.S. PATENT DOCUMENTS

| 4,085,302 | A | 4/1978 | Zenk et al. | |
| 4,313,108 | A | 1/1982 | Yoshida | 340/365 VL |
| 4,816,811 | A | 3/1989 | Bogatin et al. | 340/712 |
| 4,901,074 | A | 2/1990 | Sinn et al. | 139/919 |
| 5,418,760 | A | 5/1995 | Kawashima et al. | 368/69 |
| 5,572,573 | A | 11/1996 | Sylvan et al. | 379/61 |
| 5,584,054 | A | 12/1996 | Tyneski et al. | 455/89 |
| 5,613,137 | A | 3/1997 | Bertram et al. | 395/800 |
| 5,674,018 | A | 10/1997 | Kaufman et al. | 400/473 |
| 5,742,894 | A | 4/1998 | Jambhekar et al. | 455/90 |
| 5,818,924 | A | 10/1998 | King et al. | 379/389 |
| 5,887,995 | A | 3/1999 | Holehan | 400/479.1 |
| 5,909,211 | A | 6/1999 | Combs et al. | 345/172 |
| 5,910,009 | A | 6/1999 | Leff et al. | 434/322 |
| 5,917,906 | A | 6/1999 | Thornton | 379/433 |

FOREIGN PATENT DOCUMENTS

| EP | 0813328 A2 | 12/1997 | H04M/1/02 |
| JP | 615126 | 2/1994 | G06F/3/023 |
| JP | 06 295218 A | 10/1994 | G06F/3/03 |
| JP | 07 056672 A | 3/1995 | G06F/3/03 |
| JP | 08147087 A | 6/1996 | G06F/3/023 |
| JP | 1091305 | 4/1998 | G06F/3/02 |
| WO | WO 97/41677 | 11/1997 | H04M/1/02 |

Primary Examiner—Bipin Shalwala
Assistant Examiner—Ricardo Osorio
(74) Attorney, Agent, or Firm—Shaw Pittman LLP

(57) ABSTRACT

A touch screen overlay apparatus for use in association with a touch screen having a rigid contact surface. The touch screen overlay apparatus comprises a flexible membrane that covers at least a portion of the rigid contact surface. This flexible membrane is removably maintained in a predetermined position over the rigid contact surface to provide a more tactually desirable surface for manual actuation than the rigid contact surface. Furthermore, the flexible membrane may include one of said one or more raised dome-shaped regions which are disposed on the membrane so as to be in substantial registration with input regions on the rigid contact surface to provide tactile landmarks for the user.

16 Claims, 4 Drawing Sheets

TOUCH SCREEN OVERLAY APPARATUS

Continuation of prior application Ser. No. 09/226,344 Jan. 6, 1999, ABANDONED. This application claims the benefit of provisional application No. 60/070,652 filed Jul. 7, 1998.

BACKGROUND OF THE INVENTION

1. Field of the Invention

The present invention relates in general to a user input device for use in association with a touch screen and, in particular, to a membrane overlaid in registration with a rigid touch screen to provide or otherwise improve the tactile qualities associated with data input by a user via the rigid touch screen.

2. Background Art

Touch screens as user input devices have recently become popular in mass-market consumer electronic devices. For instance touch screens can be found in cellular telephones, cordless telephones, cash registers, personal digital assistants (PDA's), watches, calculators, kitchen appliances and many other electronic devices and generally comprises a rectangular rigid surface on which is displayed a plurality of "keys" or "buttons" which when touched by the user will cause the device to execute an associated command or function.

A touch screen typically electrically displays one or more visual cues to the user/operator and may provide multiple "keyboard" designs to facilitate operation in different modes and serves to register user input provided in association with such cues. While it is known that touch screens can be constructed of semi-rigid materials such as plastic, semi-rigid materials typically are not sufficiently resilient and robust for use in consumer electronics. Additionally, standard LCD or liquid crystal technologies favored in touch screens typically operate best in association with rigid, glass-type surface materials. Consequently, the mass-market consumer electronics industry favors the use of a rigid top surface in the construction of such touch screens. Unfortunately, the very reason these rigid materials are favored by the industry makes them less desirable for the consumer. For instance, the rigidity of the touch screen does away with the manual "depression" of the input regions and use of same may be less comfortable than when using a standard keypad, keyboard or like input device. Furthermore, the rigid surface provides little, if any, tactile cue or feedback to user to indicate where to touch the screen or whether sufficient pressure has been applied for registration by the device—inasmuch as there is no travel to the key or button.

Accordingly, it is an object of the present invention to provide an overlay for use in association with the rigid top surface of a touch screen that alleviates some of the undesirable characteristics of these rigid top surface. It is an associated object of the present invention to provide a relatively inexpensive and replaceable shield that can protect the touch screen surface.

Additionally, rigid, transparent substrates by their very nature are smooth, flat surfaces. While this construction is a virtual necessity for the video display aspect of touch screens, the rigid uniform surface fails to provide tactile landmarks to assist for the user. Thus, the use of a touch screen typically requires the user to look directly at the touch screen to view the one or more visual cues displayed thereon in order to identify where upon the touch screen surface the user is to make contact (either with a stylus, finger or other instrument) in order to input the desired command or activate the device in the intended manner. This is particularly unsatisfactory in certain cellular telephone environments, where the lack of tactile landmarks (and the focus on visual cues) invariably requires the user using a cellular telephone while driving to visually focus on the telephone rather than the road, thus, making the placement of a telephone call from an automobile difficult if not dangerous.

Accordingly, it is yet another object of the present invention to provide a tactually perceptible surface for use in association with a pre-existing rigid touch screen.

In touch screens, the device's recognition of a user's input is achieved through various methods including, but not limited to, capacitive-sensitive switches, membrane switches, pressure switches, and various high-frequency light sensing arrays. Some of these technologies require the use of styluses made of materials having certain electrical characteristics to ensure proper operation of the device. These separate styluses can be easily lost.

Accordingly, it is a further object of the present invention to provide a flexible membrane having electrical characteristics substantially identical to those of the stylus, which is maintained in registration with the touch screen so as to expedite and simplify use of the touch screen.

These and other objects of the present invention will become obvious in light of the present specification, drawings and claims.

SUMMARY OF THE DISCLOSURE

The present disclosure is directed to a touch screen overlay apparatus for use in association with a touch screen having a substantially rigid contact surface. The touch screen may have one or more indicia displayed thereon, as is known in the art. The touch screen is generally disposed within a housing and has a periphery with top, bottom, left and right edges. The touch screen overlay apparatus includes a substantially flexible membrane and means for removeably maintaining the membrane in a predetermined position over the rigid contact surface of the touch screen. In particular, the size of the flexible membrane is sufficient to cover at least a desired portion of the indicia which may be displayed on the contact surface. The membrane's flexibility provides a more desirable tactile sensation for the user than that provided by the rigid touch screen.

In a preferred embodiment, the membrane includes one or more raised dome-shaped regions. Each of these domes is disposed on the flexible membrane so as to be in substantial registration with a respective one of the anticipated indicia. These raised dome-shaped regions may be formed integrally to the membrane or may be formed by adding additional material to the upper surface of the membrane. It is further deemed within scope of present invention to use a substantially rigid overlay which incorporates flexible regions selected to correspond to regions where "keys" may be displayed.

The membrane is removably maintained in a predetermined position superimposed on at least the desired portion of the indicia displayed on the touch screen. The means for removably maintaining may take many forms. For instance, it may comprise a frame having one or more rigid or semi-rigid members, such that the membrane can be attached about its entire periphery to each of the frame members and further comprise means for mounting that frame in association with the touch screen. This mounting means may comprise a hinge. Instead, the mounting means may comprise a tongue associated with the frame and slidably disposed within a groove disposed adjacent the touch screen on the housing.

As an alternative to a frame, the mounting means may comprise a series of holes located adjacent the left and right edges of the membrane, left and right sprockets that engage the holes and means for rotating the sprockets, which may be actuated or manually or by a reversible motor. In this embodiment, the membrane edges may be re-enforced to minimize wear or damage to the membrane during the driving of same by the rotating sprockets.

In still another embodiment, the membrane can be removably maintained in a predetermined position with a band of adhesive disposed adjacent to the periphery of the membrane, such that the membrane is affixed to either the rigid contact surface or more preferably the housing about the periphery of the rigid contact surface. Alternatively, the membrane can be removably maintained with one or more fasteners disposed about the peripheries of the rigid contact surface and the membrane. These fasteners may comprise a mated pair of hook and loop fasteners, a mated pair of snaps or any other type-of-mechanical fasteners. Conceivably the membrane itself may be formed of a material, which, due to its inherent properties, is attracted to the surface of the touch screen, e.g. static charge, or the like.

In yet another embodiment, the means for removably maintaining the membrane in a predetermined position may comprise a membrane storage chamber disposed within the housing. The chamber is provided with an opening parallel and proximate to one of the edges of the touch screen surface. In this embodiment, a pair of opposing slots positioned parallel to each other and perpendicular to the chamber opening extends from the opening to a location proximate an opposite edge of the contact surface such that the membrane can be slidably restrained within the pair of slots using various means. In this embodiment, the membrane may be biased to retract into the membrane storage chamber, thus, requiring means for fastening the membrane in its touch screen registration position.

BRIEF DESCRIPTION OF THE DRAWINGS

In the drawings, which depict presently preferred embodiments of the invention and in which like reference numerals refer to like parts in different views.

BEST MODES FOR CARRYING OUT THE INVENTION

Figure 1:
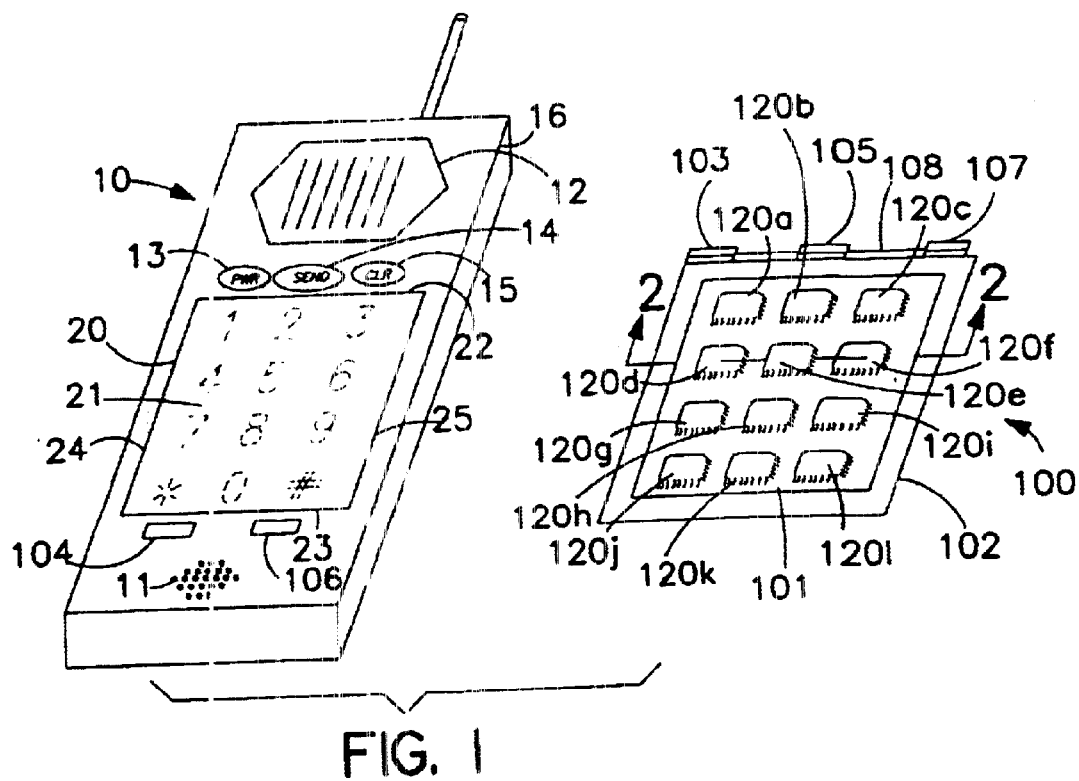
FIG. 1 of the drawings is an exploded perspective view of one embodiment of the present invention shown being used in association with a cellular or cordless telephone.

While this invention is susceptible of embodiment in many different forms, there is shown in the drawings, and will herein be described in detail, a number of embodiments, with the understanding that the present disclosure can be considered as an exemplification of the principles of the invention and is not intended to limit the invention to the embodiments illustrated.

FIG. 1 of the drawings shows a cellular or cordless telephone handset 10 having a microphone 11, an earpiece 12, momentary contact switches 13, 14 and 15, and a touch screen 20 all being maintained within housing 16. Of course, it will be understood that while a cellular or cordless telephone has been shown in the drawings and will be used in describing the present invention, the invention has application to the entire gamut of consumer electronics that include touch screen technology, including, in particular, PDAs.

Touch screen 20 has rigid contact surface 21 (usually constructed of glass) upon which indicia may be electrically displayed. Rigid contact surface 21 has a periphery with top edge 22, bottom edge 23, left edge 24 and right edge 25. In the telephone embodiment shown in the drawings, displayed indicia may include alphanumeric characters configured in the well-known matrix configuration of a touch-tone telephone keypad (as shown in FIG. 1). Additionally, the flexibility of touch screen 20 may allow the user to alternatively receive text messages, input and review an electronic telephone number/address book, and maintain a "to-do list" and/or calendar of appointments. Similar functionality can be found in PDAs, such as the PALM PILOT sold by 3COM Corporation. In each of these devices, indicia can be displayed on rigid contact surface 21 using well-known technologies, such as those involving liquid crystal displays.

In the embodiment shown in FIG. 1, touch screen overlay apparatus 100 includes flexible membrane 101 and frame 102. In alternate embodiments, other means for removeably maintaining flexible membrane 101 in operable association with touch screen 20 e.g. (See FIGS. 3, 7, 8, 9 and 10), which will be discussed hereinbelow.

Flexible membrane 101 is preferably made of a transparent, flexible material, such as mylar film (by heat forming process) or low to mid density tetrafluropolyethylene (by an injection moulding process). However, it is contemplated that flexible membrane 101 may also be formed of a translucent or even an opaque material, so long as its flexibility is maintained. In an embodiment where flexible membrane 101 is formed of an opaque material, indicia related to the displayed indicia expected to be beneath that portion of the membrane or commands executed upon touching the region associated with each indicia may be printed on flexible membrane 101. This may have particular utility in providing a foreign language translation of indicia displayed on touch screen 20.

Figure 2:
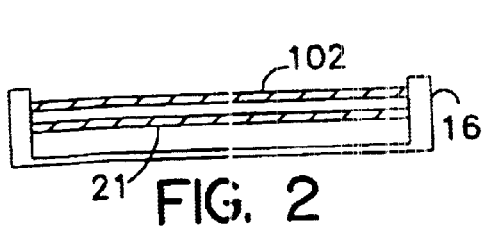
FIG. 2 of the drawings is a front cross-sectional, elevational view of one embodiment of the present invention in which a flexible membrane is disposed in registration with a rigid contact surface.
Figure 2B:
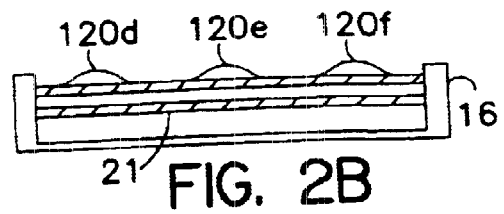
FIG. 2b of the drawings is a front cross-sectional, elevational view of another embodiment of the present invention in which a flexible membrane—having a plurality of raised dome-shaped regions formed by adding additional material to the membrane—is disposed in registration with a rigid contact surface.
Figure 2A:
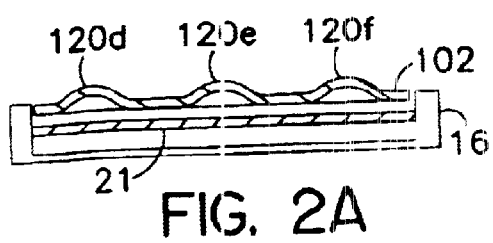
FIG. 2a of the drawings is a front cross-sectional, elevational view of another embodiment of the present invention in which a flexible membrane—having a plurality of raised dome-shaped regions integrally formed therein—is disposed in registration with a rigid contact surface.
Figure 2C:
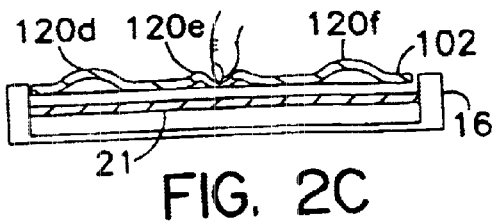
FIG. 2c of the drawings is a front cross-sectional, elevational view of a raised dome bearing flexible membrane embodiment wherein one of the domes is being manually pressed.
Figures 3A, 3B:
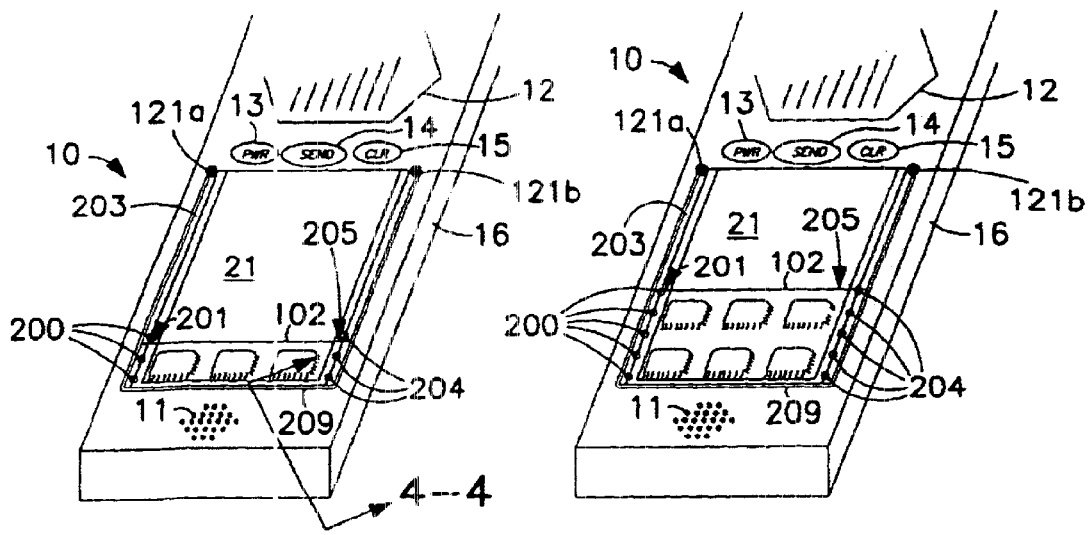
FIGS. 3a through 3d of the drawings are each partial perspective views of various stages of deployment of the flexible membrane in registration with a rigid contact surface in another embodiment of the present invention.
Figures 3C, 3D:
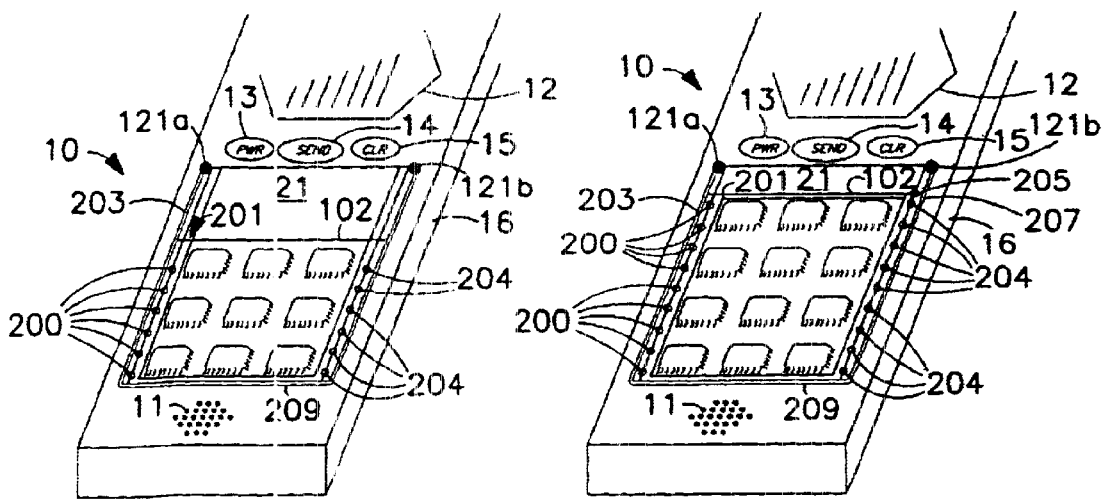

As shown in FIG. 1, in a preferred embodiment, flexible membrane 101 includes a plurality of raised dome-shaped regions 120a-1. Each of these raised dome-shaped regions may be formed integrally to flexible membrane 101 (see FIG. 2a) or by adding additional material to the membrane (see FIG. 2b). As shown in FIG. 2c, where a user's finger depresses dome-shaped region 120e, it is temporarily deformed such that a portion of flexible membrane 101 physically contacts touch screen 20. Nevertheless, as shown in FIG. 2, flexible membrane 101 need not include such raised regions to provide improved some tactile characteristics for user input. Where the flexible membrane includes raised dome-shaped regions 120a-1, each raised dome shaped region is perferrably as to be in substantial registration with a respective one of the display indicia (or associated regions) to facilitate input into touch screen 20 when flexible membrane 101 is overlaid over rigid contact surface 21 and used. Accordingly, each application will require a particular configuration to match the display configuration on the touch screen, a configuration typically programmed by the user input device manufacturer or software provider.

Where the raised dome-shaped regions are formed in a transparent membrane or from transparent material added to a pre-existing membrane, the user can view the indicia displayed by touch screen 20 to assist in selection of the desired input. Where the raised dome-shaped regions are formed a translucent or opaque membrane or from translucent or opaque material added to a pre-existing membrane, printed indicia may be required on flexible membrane 101 and applied using standard printing techniques. However, given the notoriety of the touch-tone telephone keypad configuration, it is also possible that the user will not require any visual indicia whatsoever and will rely instead upon tactile sensation and prior knowledge of this standard layout—known relationships of one key to another. No matter the type of material is employed, using the tactile landmarks provided by the addition of the domes provided by flexible membrane 101, the user can tactually locate the desired input. This functionality will prove extremely useful when operating cellular telephones under driving situations.

As shown in FIG. 1, flexible membrane 101 is of sufficient size to cover the entirety of rigid contact surface 21. However, it is within the scope of the present invention for flexible membrane 101 to cover only a portion of rigid contact surface 21. This approach, for instance, would be useful in association with the PALM PILOT manufactured by 3COM Corporation, which includes a "Graffiti writing area" that accepts and requires pen strokes of a stylus in the form of a proprietary alphabet to input various alphanumeric characters. Accordingly, in constructing flexible membrane 101 for use in association with a PALM PILOT PDA it would be desirable to provide a cutout region in substantial registration or alignment with the "graffiti writing area".

In the embodiment shown in FIG. 1, frame 102 is used to removably maintain flexible membrane 101 in a predetermined position where flexible membrane 101 is disposed above touch screen 20 and in registration with at least a desired portion of rigid contact surface 21 and possibly the displayed indicia thereon. As shown, frame 102 is a rectangle having four frame members, preferably formed of at least a semi-rigid material, such as plastic. Flexible membrane 101 is attached about its entire periphery to each of the frame members using various types of fastening means, such as adhesive, heat-bonding, or mechanical fastening means. In other commercial applications, such as a watch, frame 102 may be circular and, thus, comprise only one frame member. In view of the flexible material used to fabricate flexible membrane 101 and frame 102, there is no limit to the variation of shapes that can be formed.

As shown in FIG. 1, frame 102 has associated therewith hinge members 103, 105 and 107, which operably mate with hinge members 104 and 106 disposed on the face of telephone housing 16 adjacent bottom edge 23 of rigid contact surface 21. Rod 108 (shown in association with frame 102), is threaded through each of hinge members 103 through 107 and capped so as to be permanently connected with the hinge members. In this manner, frame 102 and flexible membrane 101 are hingedly connected to telephone housing 16 and, thus, associated with touch screen 20. The hinge members may be positioned at various locations about the housing 16 and in a manner so as to permit membrane 101 to swing away and fold back against the rear face of housing 16.

Figure 10:
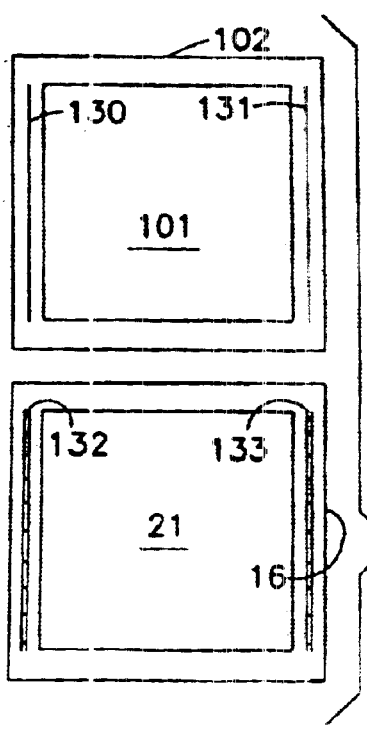
FIG. 10 of the drawings is an exploded top plan view of an embodiment of the present invention in which the flexible membrane is removably maintained in association with the rigid contact surface using a frame having a tongue engaged in a groove on the housing.

FIG. 10 discloses yet another approach to mounting frame 102 to telephone housing 16. In this embodiment, frame 102 includes tongues raised ridges 130 and 131 disposed on opposing frame members. Each of tongues 130 and 131 slidably engage a respective one of grooves 132 and 133, disposed on the face of telephone housing 16 adjacent the edges of touch screen 20.

In another embodiment shown in FIGS. 3a through 3d, left slot 203 and right slot 207 disposed on the face of telephone housing 16 are used to removably maintain flexible membrane 101 disposed above touch screen 20. In this embodiment, a first series of holes 200 located in left edge region 201 of membrane 101 and a second series of holes 204 located in right edge region 205 of membrane 101 in combination with left and right sprockets 202 and 206 and means for rotating the left and right sprockets simultaneously at the same rate of rotation to ensure that flexible membrane 101 is ultimately positioned in its desired position.

Figure 4:
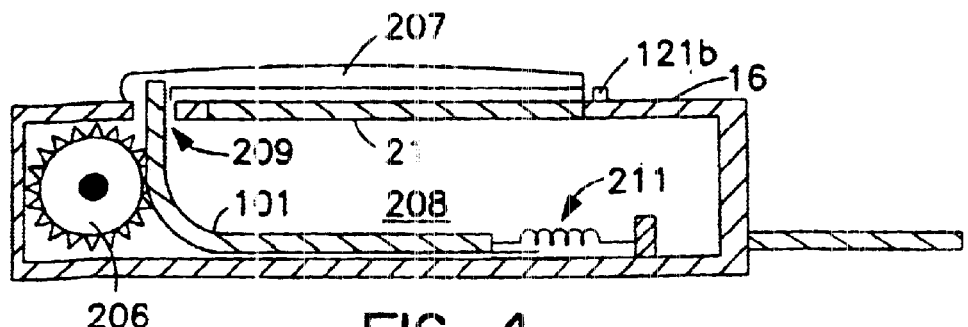
FIG. 4 is a side elevational, cross-sectional view taken along line 4—4 of FIG. 3a showing, in particular, the membrane storage chamber, right sprocket and spring-biasing member.
Figure 5:
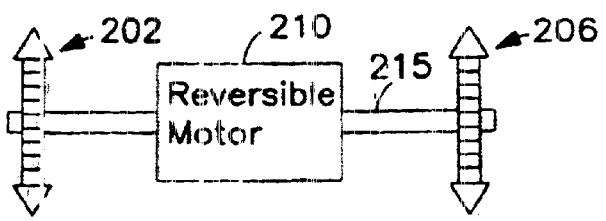
FIG. 5 of the drawings is a schematic representation of one embodiment of the drive mechanism for deploying and retracting the flexible membrane.
Figure 6:
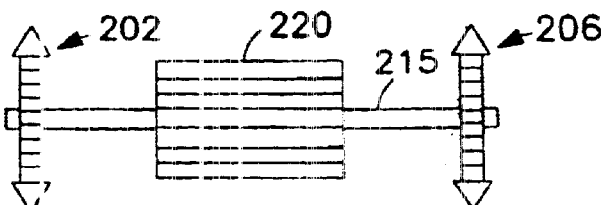
FIG. 6 of the drawings is a schematic representation of another embodiment of the drive mechanism for deploying and retracting the flexible membrane.

As shown in FIGS. 4, 5 and 6, left and right sprockets 202 and 206 are disposed within telephone housing 16. Both sprockets have the same number of teeth which engage a respective one of first and second series of holes 200 and 204. These sprockets are rotated by rotating means, which may comprises common axle 215 coupled to either reversible electric motor 210 (see FIG. 5) or manually actuated knob 220 (see FIG. 6). In this manner, flexible membrane 101 is deployed via left and right slots 203 and 207 disposed on the face of housing 16, in a sequence shown in FIGS. 3a through 3d, until the membrane is in its desired position (not shown). To protect flexible membrane against damage caused by repeated deployment, left and right edge regions 201 and 205 may be formed of a semi-rigid material or may comprise the same material as the remainder of membrane 101, but with additional thickness to resist wear.

As shown in FIG. 4, in this embodiment, flexible membrane 101 may be disposed within membrane storage chamber 208 disposed within housing 16 when it is not in use. Membrane storage chamber 208 has an opening 209, which extends substantially parallel and proximate to bottom edge 23 of rigid contact surface 21. The left and right slots 203 and 207 are each positioned substantially parallel to each other and substantially perpendicular to membrane storage chamber opening 209. These slots extending from opening 209 to a location proximate an opposite edge of rigid contact surface 21. As shown in FIG. 4, flexible membrane 101 can be biased by spring 211 to retract into membrane storage chamber 208. In such an embodiment, fastening means such as an eyelet-hook pairs 200/121a and 204/121b are used to maintain membrane 101 in its predetermined position. It is also contemplated that a user can physically grasp the lead end of flexible membrane 101 and guide it along left and right slots 203 and 207 until the lead hole in the first and second series of holes engages hooks or posts 121a and 121b.

Figure 7:
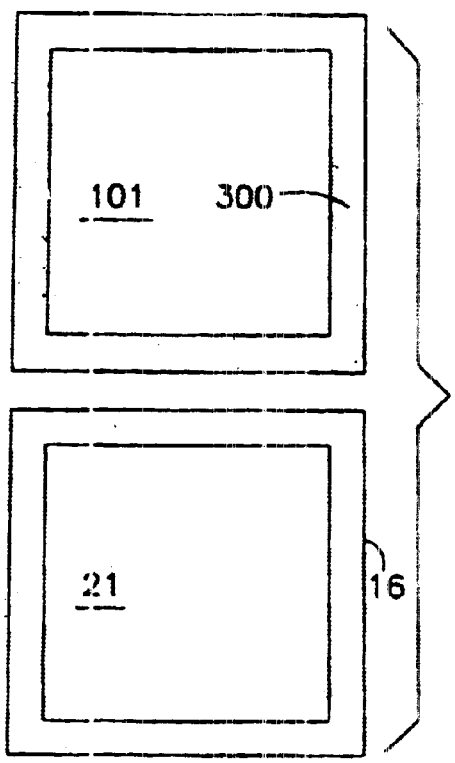
FIG. 7 of the drawings is an exploded top plan view of another embodiment of the present invention in which the flexible membrane is removably maintained in association with the rigid contact surface using adhesive.

In the embodiment shown in FIG. 7, flexible membrane 101 is removably maintained in association with rigid contact surface 21 using a band of adhesive disposed about the periphery of the membrane. In particular, the adhesive has been disposed at a location that will apply outside the rigid contact surface on housing 16. It is also conceivable that flexible membrane 101 may have inherent properties that cause it to removeably adhere to housing 16, such as a propensity to store static electricity.

Figure 8:
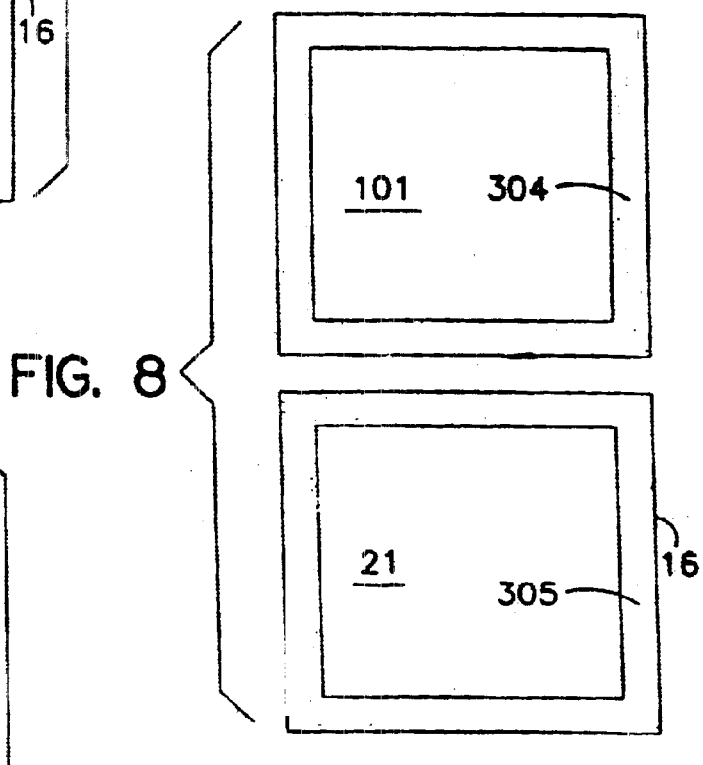
FIG. 8 of the drawings is an exploded top plan view of an embodiment of the present invention in which the flexible membrane is removably maintained in association with the rigid contact surface using a mated pair of hook and loop fasteners.

In the embodiment shown in FIG. 8, flexible membrane 101 is removably maintained in association with rigid contact surface 21 using a mated pair of hook and loop fasteners, commercially known as VELCRO.

Figure 9:
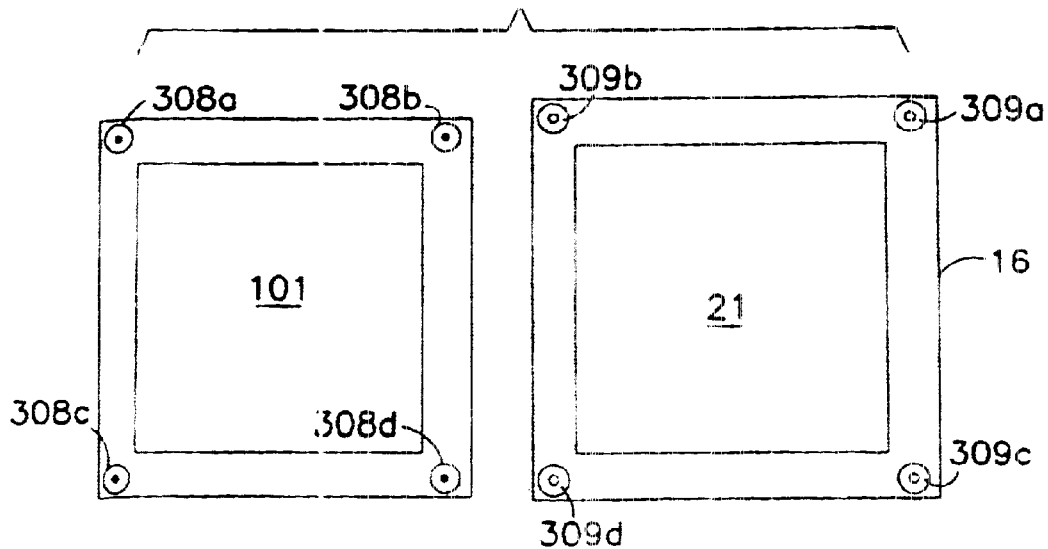
FIG. 9 of the drawings is an exploded top plan view of an embodiment of the present invention in which the flexible membrane is removably maintained in association with the rigid contact surface using mated pairs of snaps.

In the embodiment shown in FIG. 9, flexible membrane 101 is removably maintained in association with rigid contact surface 21 using mated pairs of snaps 308 and 309.

The foregoing description and drawings are merely to explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A touch screen overlay apparatus for use in association with a user input apparatus having a touch screen with a rigid contact surface with one or more indicia displayed thereon, said contact surface having a periphery with a top edge, a bottom edge, a left edge and a right edge, said touch screen being disposed within a housing, said touch screen overlay apparatus comprising:
    a membrane of a size sufficient to cover one or more desired ones of said one or more indicia displayed on said rigid contact surface, said membrane being formed of a flexible material, said membrane has a left edge region and a right edge region; and
    means for removably maintaining said membrane in a predetermined position in which said membrane is superimposed on at least said desired ones of said one or more indicia, said means for removably maintaining said membrane in a predetermined position comprising:
        a first series of holes located in said left edge region of said membrane;
        a second series of holes located in said right edge region of said membrane;
        a left sprocket having teeth that engage said first series of holes;
        a right sprocket having teeth that engage said second series of holes; and
        means for rotating said left and right sprockets simultaneously at the same rate of rotation.

2. The invention according to claim 1 wherein said left and right edge regions are formed of a semi-rigid material.

3. The invention according to claim 1 wherein said rotating means includes a reversible electric motor.

4. The invention according to claim 1 wherein said rotating means includes a manually actuated knob.

5. A touch screen overlay apparatus for use in association with a user input apparatus having a touch screen with a rigid contact surface with one or more indicia displayed thereon, said contact surface having a periphery with a top edge, a bottom edge, a left edge and a right edge, said touch screen being disposed within a housing, said touch screen overlay apparatus comprising:
    a membrane of a size sufficient to cover one or more desired ones of said one or more indicia displayed on said rigid contact surface, said membrane being formed of a flexible material; and
    means for removably maintaining said membrane in a predetermined position in which said membrane is superimposed on at least said desired ones of said one or more indicia, wherein said means for removably maintaining said membrane in a predetermined position in which said membrane comprises:
        a membrane storage chamber disposed within said housing, said membrane storage chamber having an opening extending substantially parallel and proximate to one of said edges of said contact surface;
        a pair of opposing slots, each of said opposing slots being positioned substantially parallel to each other and substantially perpendicular to said membrane storage chamber opening, each of said opposing slots extending from said membrane storage chamber opening to a location proximate an opposite edge of said contact surface; and
        means for slidably restraining said membrane within said pair of slots.

6. The invention according to claim 5 wherein said membrane is biased to retract into said membrane storage chamber, said touch screen overlay apparatus further comprising means for fastening said membrane in its touch screen registration position.

7. The invention according to claim 5 wherein said membrane has a left edge region and a right edge region, said means for removably maintaining said membrane in a predetermined position comprises:
    a first series of holes located in said left edge region of said membrane;
    a second series of holes located in said right edge region of said membrane;
    a left sprocket having teeth that engage said first series of holes;
    a right sprocket having teeth that engage said second series of holes; and means for rotating said left and right sprockets simultaneously at the same rate of rotation.

8. The invention according to claim 7 wherein said left and right edge regions are formed of a semi-rigid material.

9. A touch screen overlay apparatus for use in association with a user input apparatus having a touch screen with a rigid contact surface encompassing one or more input regions, said rigid contact surface having a periphery with a top edge, a bottom edge, a left edge and a right edge, said touch screen being disposed within a housing, said touch screen overlay apparatus comprising:

a flexible membrane of a size sufficient to cover at least a portion of said rigid contact surface, said flexible membrane including one or more raised dome-shaped regions, said flexible membrane has a left edge region and a right edge region; and means for removably maintaining said flexible membrane in a predetermined position in which at least one of said one or more raised dome-shaped regions is in substantial registration with one of said one or more input regions, wherein said means for removably maintaining said flexible membrane in a predetermined position comprising:

a first series of holes located in said left edge region of said flexible membrane;

a second series of holes located in said right edge region of said flexible membrane;

a left sprocket having teeth that engage said first series of holes;

a right sprocket having teeth that engage said second series of holes; and means for rotating said left and right sprockets simultaneously at the same rate of rotation.

10. The invention according to claim 9 wherein said left and right edge regions are formed of a semi-rigid material.

11. The invention according to claim 9 wherein said rotating means includes a reversible electric motor.

12. The invention according to claim 9 wherein said rotating means includes a manually actuated knob.

13. A touch screen overlay apparatus for use in association with a user input apparatus having a touch screen with a rigid contact surface encompassing one or more input regions, said rigid contact surface having a periphery with a top edge, a bottom edge, a left edge and a right edge, said touch screen being disposed within a housing, said touch screen overlay apparatus comprising:

a flexible membrane of a size sufficient to cover at least a portion of said rigid contact surface, said flexible membrane including one or more raised dome-shaped regions; and means for removably maintaining said flexible membrane in a predetermined position in which at least one of said one or more raised dome-shaped regions is in substantial registration with one of said one or more input regions, wherein said means for removably maintaining said flexible membrane in a predetermined position comprising:

a membrane storage chamber disposed within said housing, said membrane storage chamber having an opening extending substantially parallel and proximate to one of said edges of said contact surface;

a pair of opposing slots, each of said opposing slots being positioned substantially parallel to each other and substantially perpendicular to said membrane storage chamber opening, each of said opposing slots extending from said membrane storage chamber opening to a location proximate an opposite edge of said contact surface; and means for slidably restraining said membrane within said pair of slots.

14. The invention according to claim 13 wherein said flexible membrane is biased to retract into said membrane storage chamber, said touch screen overlay apparatus further comprising means for fastening said flexible membrane in its touch screen registration position.

15. The invention according to claim 13 wherein said flexible membrane has a left edge region and a right edge region, said means for removably maintaining said flexible membrane in a predetermined position comprises:

a first series of holes located in said left edge region of said flexible membrane;

a second series of holes located in said right edge region of said flexible membrane;

a left sprocket having teeth that engage said first series of holes;

a right sprocket having teeth that engage said second series of holes; and means for rotating said left and right sprockets simultaneously at the same rate of rotation.

16. The invention according to claim 15 wherein said left and right edge regions are formed of a semi-rigid material.

* * * * *